(12) United States Patent
Morishima et al.

(10) Patent No.: US 8,320,730 B2
(45) Date of Patent: Nov. 27, 2012

(54) INPUT/OUTPUT DEVICE AND INPUT/OUTPUT MANAGEMENT SYSTEM

(75) Inventors: Shinichi Morishima, Kanagawa (JP); Yoshinori Koishikawa, Kanagawa (JP); Ryo Abiko, Kanagawa (JP)

(73) Assignee: Sony Corporation, Tokyo (JP)

( * ) Notice: Subject to any disclaimer, the term of this patent is extended or adjusted under 35 U.S.C. 154(b) by 1212 days.

(21) Appl. No.: 10/865,610

(22) Filed: Jun. 10, 2004

(65) Prior Publication Data

US 2005/0018056 A1 Jan. 27, 2005

(30) Foreign Application Priority Data

Jun. 13, 2003 (JP) ................... 2003-170002

(51) Int. Cl.
*H04N 5/765* (2006.01)
*H04N 5/931* (2006.01)

(52) U.S. Cl. .................. 386/200; 386/204
(58) Field of Classification Search ............ 386/46
See application file for complete search history.

(56) References Cited

U.S. PATENT DOCUMENTS

| | | | | |
|---|---|---|---|---|
| 6,088,040 | A * | 7/2000 | Oda et al. | 345/473 |
| 6,115,104 | A * | 9/2000 | Nakatsuka | 355/40 |
| 6,300,976 | B1 * | 10/2001 | Fukuoka | 348/231.99 |
| 6,711,343 | B1 * | 3/2004 | Matsumi et al. | 386/46 |
| 6,744,969 | B1 | 6/2004 | Kamiyama et al. | |
| 6,914,181 | B2 * | 7/2005 | Toshitani | 84/645 |
| 2003/0161468 | A1 * | 8/2003 | Iwagaki et al. | 380/201 |
| 2003/0223466 | A1 * | 12/2003 | Noronha et al. | 370/537 |
| 2004/0117645 | A1 * | 6/2004 | Okuda et al. | 713/193 |

FOREIGN PATENT DOCUMENTS

| | | |
|---|---|---|
| JP | 9-319523 | 12/1997 |
| JP | 11-272531 | 10/1999 |
| JP | 2000-149410 | 5/2000 |
| JP | 2000-253357 | 9/2000 |
| JP | 2002-369133 | 12/2002 |

* cited by examiner

*Primary Examiner* — William C Vaughn, Jr.
*Assistant Examiner* — Oluwaseun A Adegeye
(74) *Attorney, Agent, or Firm* — Frommer Lawrence & Haug LLP; William S. Frommer; Ellen Marcie Emas

(57) ABSTRACT

The present invention relates to an I/O device capable of collectively managing and easily editing AV data recorded by a plurality of video cameras with transfer bit rate between devices kept constant, and an I/O management system. The I/O management system according to the present invention comprises: a storage device having a non-linear accessible recording medium; a control unit for controlling output of externally supplied data with respect to the storage device, or input of data from the storage device; and one or more I/O device having a record information management unit for managing, through a file system, record information acquired at the time when data is recorded onto the recording medium, and controls input of data from the storage device on the basis of the record information managed by a file system at the time of reproduction.

13 Claims, 6 Drawing Sheets

INPUT/OUTPUT DEVICE AND INPUT/OUTPUT MANAGEMENT SYSTEM

BACKGROUND OF THE INVENTION

1. Field of the Invention

The present invention relates to an input/output device which control data input/output operations from or to a recording device having a non-linear accessible recording medium, and an input/output management system.

This application claims priority of Japanese Patent Application No. 2003-170002, filed on Jun. 13, 2003, the entirety of which is incorporated by reference herein.

2. Description of the Related Art

A TV program to be broadcasted by a broadcasting station is supplied such that audio or video (hereinafter, referred to AV) data, which is a material for a TV program taken by TV video camera, is once recorded for later reproduction on a non-linear accessible server, then additional AV data for TV spot or the like is inserted into the AV data to edit the resultant AV data for TV broadcast, and the edited data is sent to a broadcast network. Such Recording and reproducing processes of AV data for TV broadcast are performed through a data recording/reproduction apparatus as disclosed in, for example, Patent Document 1 (Jpn. Pat. Appln. Laid-Open Publication No. 2000-149410).

FIG. 1 shows a configuration of the data recording/reproduction apparatus in which the above recording and reproducing processes are performed. For a recording process of externally input AV data in this data recording/reproduction apparatus 9, firstly, data input through a port 61A is compressed by an encoder 62, and the compressed data is then temporarily stored in a buffer memory 66. A data management unit 34A accesses a recording/reproduction unit 33 in the time slot period assigned thereto so as to transfer the data stored in the buffer memory 66 to the recording/reproduction unit 33 via an internal bus 30.

In the recording/reproduction unit 33, the transferred data is temporarily stored in a buffer memory 49, followed by being divided by a predetermined unit. The resultant data is finally stored in an HDD 45 with parity data being added to each of the divided data.

Next, for output of the data stored in the HDD 45 to outside of the apparatus, firstly, a data management unit 34B accesses the recording/reproduction unit 33 in the time slot period assigned thereto so as to make a request for data reproduction. Upon receiving the request, the recording/reproduction unit 33 allows a video disc controller 47 to read out the AV data and parity data stored in the HDD 45. The read out AV data and parity data are then subjected to error correction, and thus, the AV data is reproduced. After being temporarily stored in the buffer memory 49, the reproduced AV data is read out and transferred to the data management unit 34B via the internal bus 30.

The AV data is then transferred via a buffer memory 67 in the data management unit 34B to a decoder 63 in a data input/output unit 37B for data expansion, followed by being transferred via a switch 65 to a terminal 61B, through which the AV data is output to outside of the apparatus.

Further, for editing the AV data for TV broadcast by inserting additional AV data for TV spot or the like into the AV data, an edit unit 51 extracts at least one of the data input from outside of the apparatus and the data reproduced by the recording/reproduction unit 33, to execute the editing operation. The edit unit 51 uses a matrix switcher, an audio mixer, or the like included therein, or utilizes, as needed, functions of a special effect unit 39 to edit the AV data.

That is, according to the conventional data recording/reproduction apparatus, recording/reproduction functions, input/output functions and an edit function can be realized by a single apparatus.

In the case of creating a TV program including many flashbacks or cuts, it is necessary that AV data, which is a material for the TV program taken by a plurality of video cameras, be recorded on a large-capacity server for editing. In this case, a file system for managing record information such as a record start position, a record end position, or the like is required to manage the AV data as a file.

However, in the conventional data recording/reproduction apparatus, a file system is generally included in the apparatus as a component thereof. Further, since AV data input from a video camera is stored in a server incorporated in each data recording/reproduction apparatus, AV data recorded with a plurality of video cameras cannot be managed by a single server, leading to a difficulty in collectively editing these AV data.

In addition, the transfer bit rate between the data recording/reproduction apparatus and each server needs to be kept constant by using only AV data, which has a constant bandwidth, as an electrical signal exchanged with a server at the time of edit.

SUMMARY OF THE INVENTION

The present invention has been made to solve the above problem, and an object of the present invention is to provide an input/output device capable of collectively managing and easily editing AV data taken by a plurality of video cameras with the transfer bit rate between devices kept constant, and an input/output management system.

To solve the above problem, according to the present invention, there is provided an input/output device which controls data input/output operations from or to a recording device having a non-linear accessible recording medium, comprising: an input/output control means for controlling output of externally supplied data with respect to the recording device, or input of data from the recording device; and a record information management means for managing, through a file system, record information acquired at the time when data is recorded onto the recording medium, wherein the input/output control means controls input of data from the recording device on the basis of the record information managed by the file system of the record information management means.

To solve the above problem, according to another aspect of the present invention, there is provided an input/output device which controls data input/output operations from or to a recording device having a non-linear accessible recording medium, comprising: an input/output control means for controlling output of externally supplied data with respect to the recording device, or input of data from the recording device; and a communication means for exchanging record information acquired at the time when data is recorded onto the recording medium with a record information management device which manages the record information through a file system, wherein the input/output control means controls input of data from the recording device on the basis of the record information received from the record information management device.

To solve the above problem, according to still another aspect of the present invention, there is provided an input/output management system comprising: a recording device having a non-linear accessible recording medium; and one or more input/output devices which control output of externally supplied data with respect to the recording device or input of data from the recording device, and has a record information management means for managing, through a file system, record information acquired at the time when data is recorded onto the recording medium, wherein the input/output device controls input of data from the recording device on the basis of the record information managed by the file system of the record information management means.

To solve the above problem, according to still another aspect of the present invention, there is provided an input/output management system comprising: a recording device having a non-linear accessible recording medium; one or more input/output devices which control output of externally supplied data with respect to the recording device or input of data from the recording device; and a record information management device which manages, through a file system, record information acquired at the time when data is recorded onto the recording medium, wherein the input/output device controls input of data from the recording device on the basis of the record information managed by the file system of the record information management device.

Therefore, in the input/output device and input/output management system to which the present invention is applied, a file system which manages record information of data and a storage device are independently provided, so that an electrical signal exchanged between the storage device and input/output device can be constituted only by AV data. That is, the transfer bit rate between the devices can be kept constant, thereby realizing a smooth reproduction.

Further, in the input/output device and input/output management system to which the present invention is applied, it is possible to share the AV data taken by a plurality of video cameras by storing the AV data in a single storage device, allowing the AV data to be utilized greatly as material data for editing. Therefore, the number of the input/output devices can be adjusted according to purpose or application, which can result in serious cost reduction.

DETAILED DESCRIPTION OF THE PREFERRED EMBODIMENTS

Figure 1:
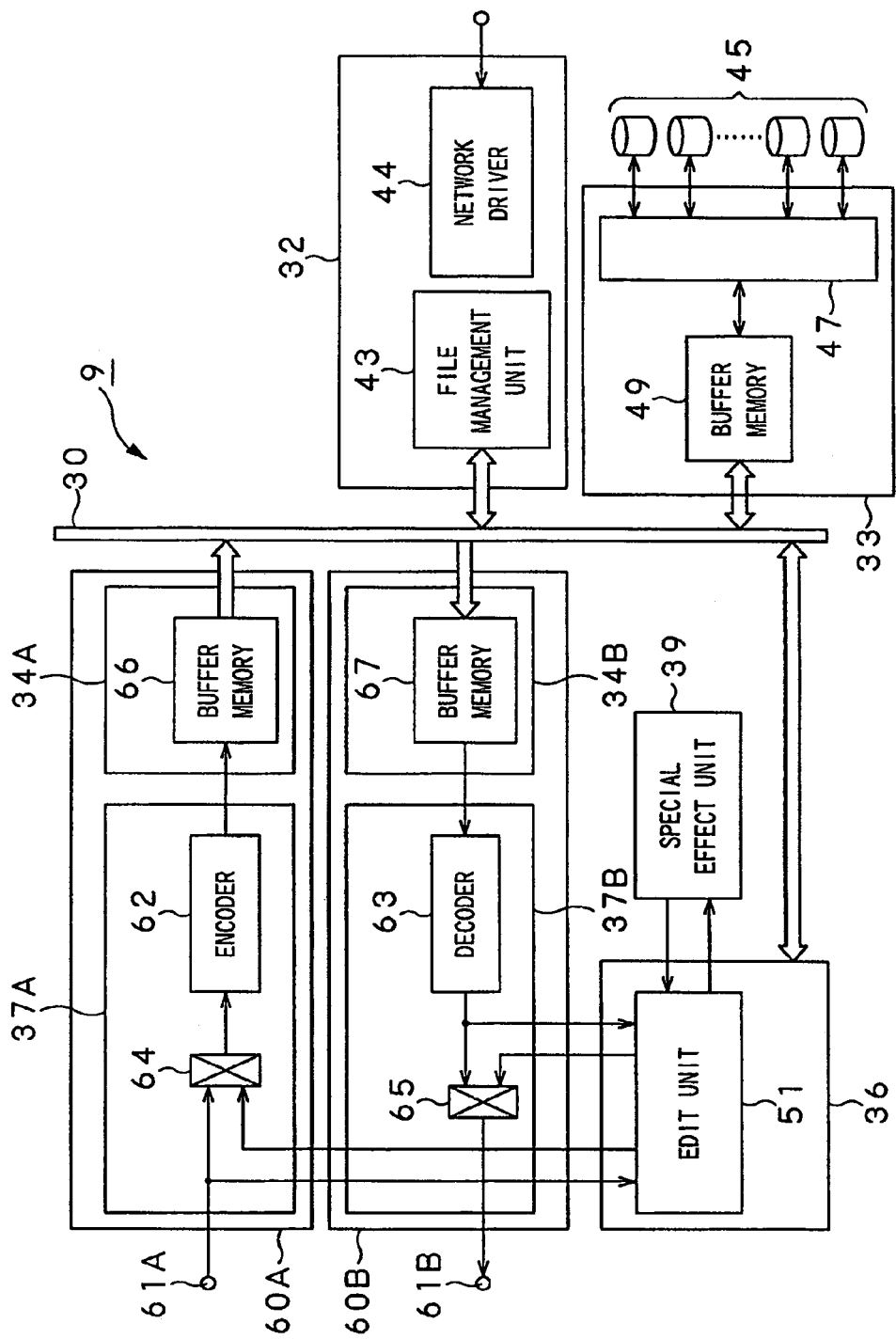
FIG. 1 is a block diagram for explaining the configuration of a conventional data recording/reproduction apparatus.
Figure 2:
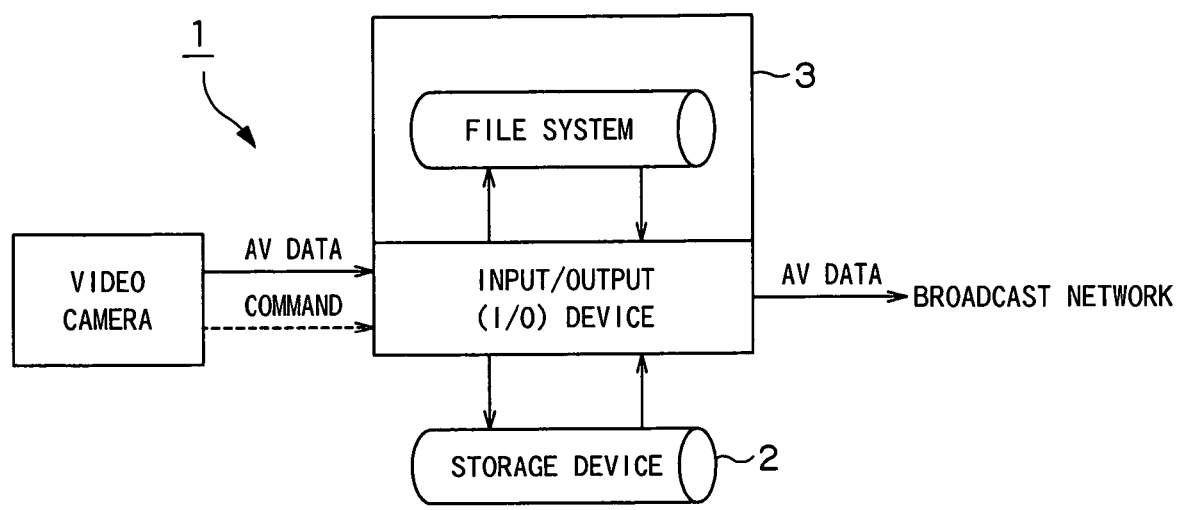
FIG. 2 is a block diagram for explaining the configuration of an input/output (I/O) management system to which the present invention is applied.

An embodiment of the present invention will be described below in detail with reference to the accompanying drawings. As shown, for example, in FIG. 2, an input/output management system (hereinafter, referred to I/O management system) 1 to which the present invention is applied comprises a storage device 2 having a non-linear accessible recording medium, and an input/output device (hereinafter, referred to I/O device) 3 which controls output of data to the storage device 2 or controls input of data from the storage device 2.

The I/O device 3 is generally connected to a video camera used in a broadcasting station, and receives video or audio data (AV data) from the video camera while acquiring record information relating to the AV data. The I/O device 3 then outputs the AV data to the storage device 2 for recording or receives AV data from the storage device 2. The AV data transmitted from the video camera is thus sent to a broadcast network. That is, the I/O device 3 controls output of externally supplied AV data to the storage device 2 or controls input of AV data from the storage device 2. In addition to the AV data, a predetermined command is transmitted from the video camera to the I/O device 3. The I/O device 3 performs a predetermined operation based on the command. Further, the I/O device 3 includes a file system for managing record information. While referring to the file system, the I/O device 3 reads out AV data stored in the storage device 2 at the time of reproduction. At this time, it is possible, in the I/O device 3, to edit the AV data for TV broadcast by inserting additional AV data for TV spot or the like into the AV data read out from the storage device 2.

Figure 3:
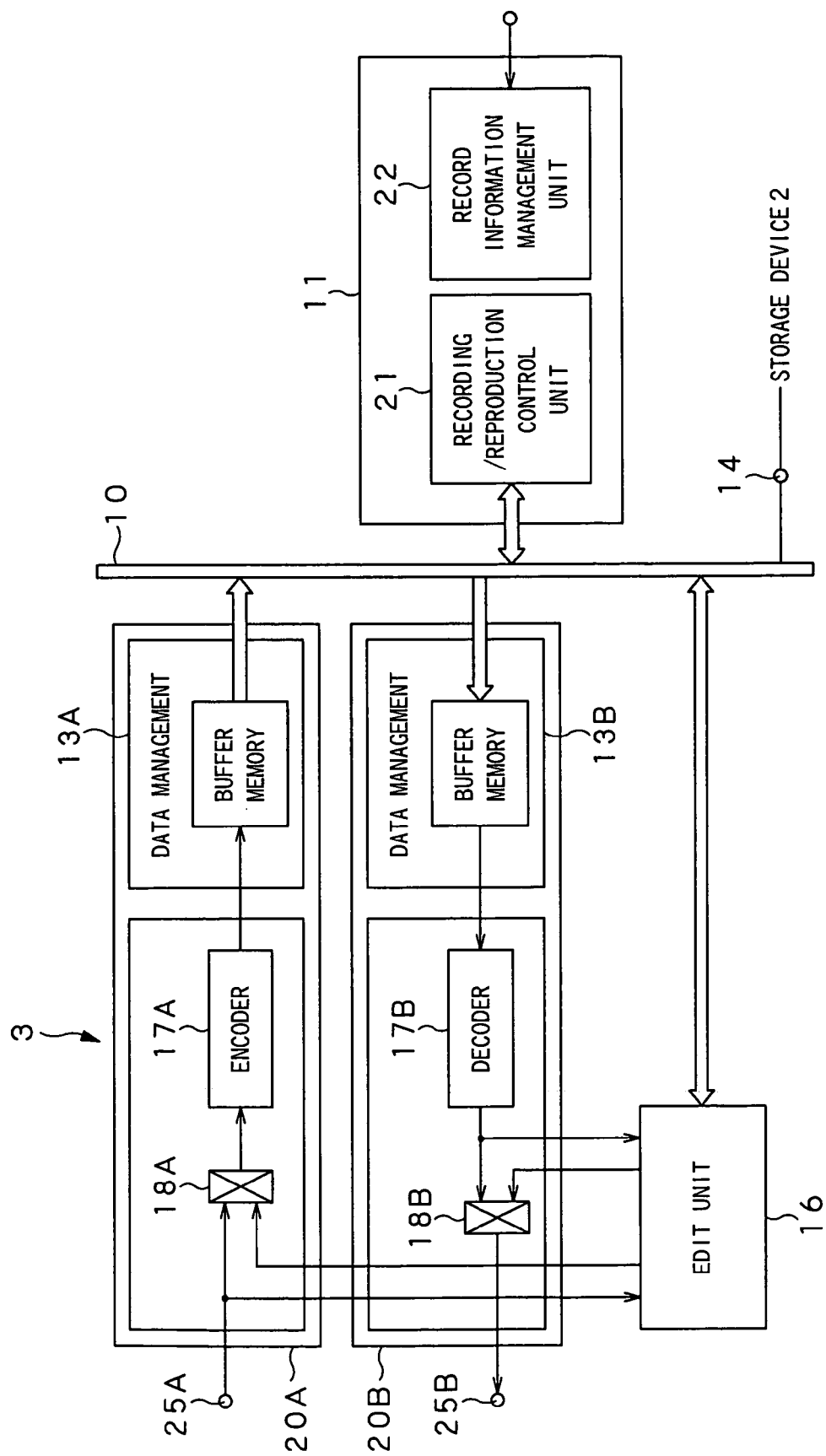
FIG. 3 is a block diagram for explaining the configuration of an input/output (I/O) device to which the present invention is applied.

FIG. 3 is a block diagram showing a configuration of the I/O device 3. The I/O device 3 is constituted by, for example, a personal computer (PC) or the like, and has an internal bus 10 for transferring AV data or commands. Connected to the internal bus 10 are at least a control unit 11, a data management unit 13, and an edit unit 16. The control unit 11 has a CPU for controlling each component of the I/O device 3. Further, at least an input/output port (hereinafter, referred to I/O port) 14 for input/output of AV data from or to the storage device 2 is connected to the internal bus 10. Connected respectively to the data management units 13A and 13B are an encoder 17A and a decoder 17B, which are further connected to switches 18A and 18B, respectively.

The control unit 11 includes a recording/reproduction control unit 21, and a record information management unit 22. The recording/reproduction control unit 21 controls output of the externally supplied AV data to the storage device 2, or controls input of AV data from the storage device 2. The record information management unit 22 manages record information relating to the AV data to be recorded and issues it, at the time of recording, in response to access from the recording/reproduction control unit 21. That is, the record information management unit 22 is configured to arrange the AV data to be filed recorded and on the storage device 2, or to control reproduction of the AV data transmitted from the storage device 2. Every time AV data is recorded on the storage device 2, the record information management unit 22 acquires record information relating the recorded AV data. Incidentally, the record information includes information relating to, for example, a record area, a record start position, a record end position, and the like of the AV data file stored in the storage device 2. The above information is managed by a file system in the record information management unit 22. Note that the control unit 11 may include a network driver (not shown) for inputting/outputting AV data via an external network such as an Ethernet™.

The encoder 17A, data management unit 13A and switch 18A constitute a port 20A. The decoder 17B, data management unit 13B and switch 18B constitute a port 20B.

The encoder 17A compresses data conforming to the SDI standard. The switch 18A is controlled by the control unit 11, and has one input port connected to a terminal 25A, the other input port connected to the edit unit 16, and an output port connected to an input port of the encoder 17A. Incidentally, the terminal 25A is also connected to the edit unit 16.

The decoder 17B expands the compressed data to convert it into the data conforming to the SDI standard. The switch 18B is controlled by the control unit 11, and has two inputs and one output. One input port is connected to the edit unit 16, the other input port is connected to an output port of the decoder 17B, and an output port is connected to a terminal 25B. Incidentally, the output port of the decoder 17B is also connected to the edit unit 16.

The data management unit 13A has a buffer memory interposed between the output port of the encoder 17A and the internal bus 10. The data management unit 13B has a buffer memory interposed between the input port of the decoder 17B and the internal bus 10. The data management unit 13A is configured to temporarily store the AV data that is supplied from the terminal 25A or to transfer the AV data to the I/O port 14 in accordance with a command issued by the control unit 11. The AV data transferred to the I/O port 14 is supplied to the storage device 2. The data management unit 13B is configured to temporarily store the AV data that is supplied from the storage device 2 via the I/O port 14 or to transfer the AV data to the decoder 17B in accordance with a command issued by the control unit 11.

Next, an operation of the I/O device 3 to which the present invention is applied will be described.

First, a recording operation of the externally input AV data will be described. AV data is supplied to the terminal 25A. The AV data is transferred, via the switch 18A, to the encoder 17A, followed by being compressed. The compressed AV data is temporarily stored in the buffer memory of the data management unit 13A. In this period, the recoding/reproduction control unit 21 accesses the storage device 2 in the time slot period assigned thereto, so that the AV data stored in the buffer memory is transferred, via the internal bus 10 and I/O port 14, to the storage device 2. At the same time, the record information representing information relating to a record area, a record start position, a record end position, and the like of the AV data stored in the storage device 2 is generated in the record information management unit 22.

Secondly, an output operation of the AV data stored in the storage device 2 to outside the device will be described. The recoding/reproduction control unit 21 accesses a file system of the record information management unit 22 to acquire record information relating to the AV data to be reproduced. Based on the record information, the recoding/reproduction control unit 21 accesses the storage device 2. In response to the access by the recording/reproducing control unit 21, the storage device 2 transmits the AV data at the record position represented by the record information to the I/O device 3. The AV data supplied, via the I/O port 14, to the I/O device 3 is temporarily stored in the buffer memory of the data management unit 13B, followed by being expanded in the decoder 17B, and sent to outside the device via the switch 18B and terminal 25B.

Thirdly, an operation of editing the AV data for TV broadcast with additional AV data for TV spot or the like being inserted into the AV data will be described. The edit unit 16 extracts one of the AV data input from outside of the apparatus and the AV data read out from the storage device 2 to execute the editing operation with respect to the extracted data. The edit unit 16 uses a matrix switcher, an audio mixer, or the like included therein, or utilizes, as needed, functions of a special effect unit to edit the AV data.

That is, the above configured I/O management system 1 including the I/O device 3 has an advantage in the following point.

Unlike the AV data which has a substantially fixed bandwidth, signals for obtaining record information or inquiring about the presence or absence of the record information have uneven bandwidths. Therefore, when a file system for managing record information is provided in the storage device 2, recording information and the like are also required to be exchanged, as an electrical signal, between the storage device 2 and the I/O device 3d in addition to the AV data, with the result that the transfer bit rate between the storage device 2 and the I/O device 3d cannot be kept constant, making it difficult to design a communication path between the two devices.

On the other hand, in the I/O management system 1 in which a file system for managing record information of AV data and the storage device 2 are independently provided, only AV data is exchanged, as an electrical signal, between the storage device 2 and the I/O device 3. That is, the transfer bit rate between the devices can be kept constant, thereby realizing a smooth reproduction.

Next, another configuration of the I/O management system to which the present invention is applied will be described with reference to FIGS. 4 to 7.

Figure 4:
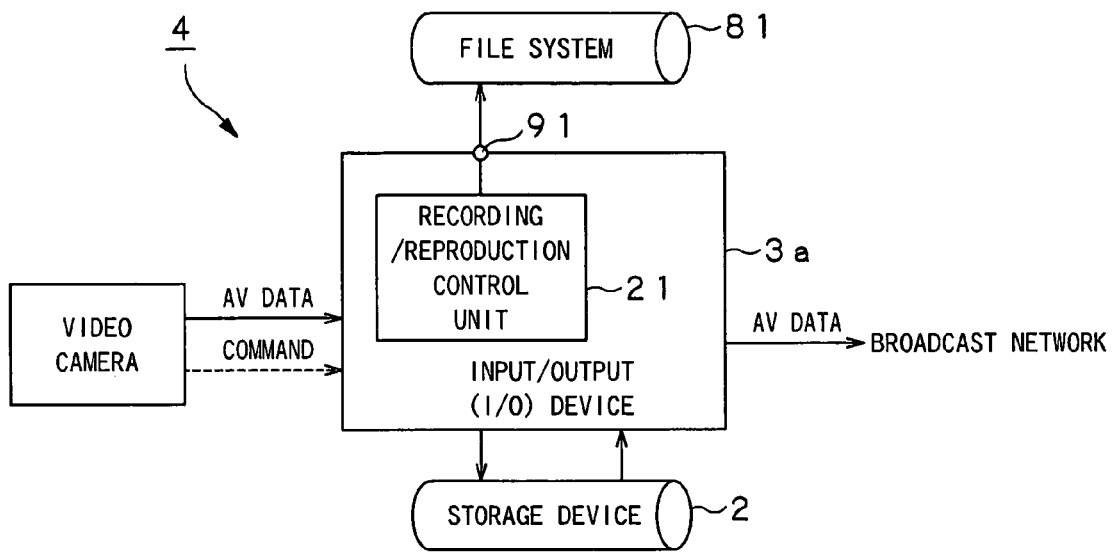
FIG. 4 is a block diagram for explaining another example of the configuration of an I/O management system.

An I/O management system 4 shown in FIG. 4 comprises a storage device 2 having a non-linear accessible recording medium, an I/O device 3a which records data on the storage device 2 and reproduces the data recorded in the storage device 2, and a record information management device 81 for managing record information.

The record information management device 81 has the same function as the aforementioned record information management unit 22 and is provided separately from the I/O device 3a in this example. The record information management device 81 includes a file system for managing record information.

Accordingly, the I/O device 3a has a configuration in which the record information management unit 22 of the control unit 11 in the above example is omitted. In this case, the I/O device 3a exchanges record information with the separately provided record information management device 81 via a terminal 91 connected to the recording/reproduction control unit 21.

That is, the I/O management system 4 in which the storage device 2, the I/O device 3a, and the record information management device 81 having a file system are independently provided can obtain the same advantage as with the I/O management system 1.

Figure 5:
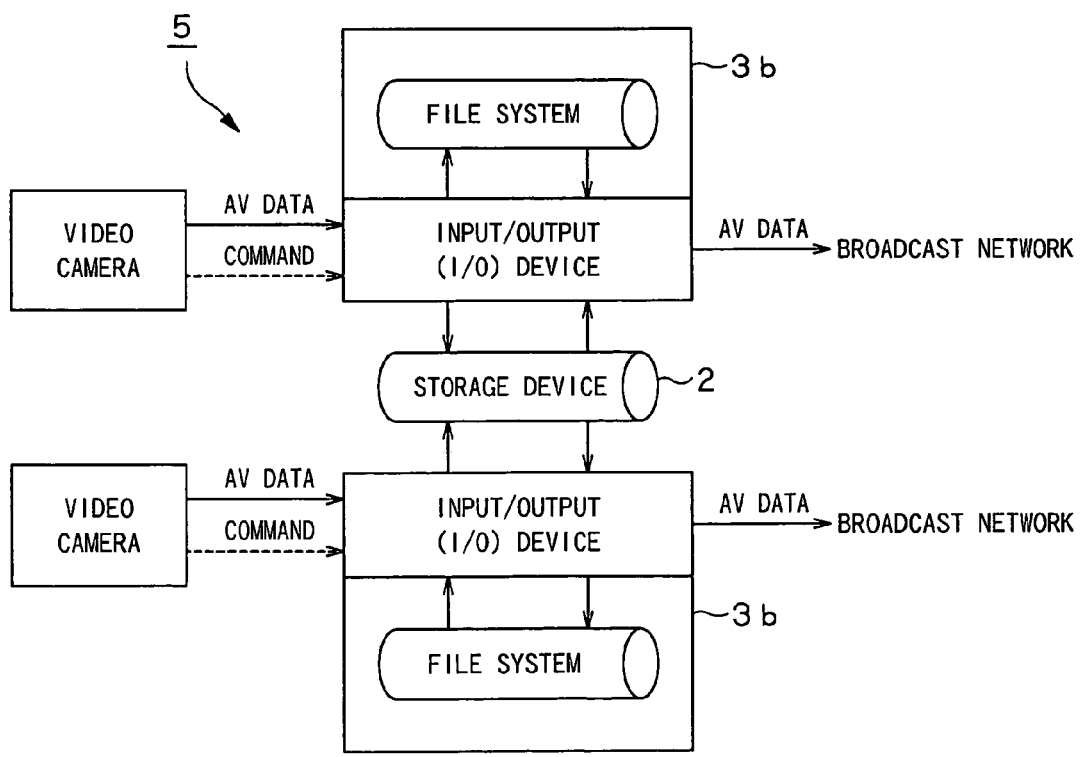
FIG. 5 is a block diagram showing an I/O management system having a plurality of I/O devices which record data on a server and reproduce the data stored in the server.

An I/O management system 5 shown in FIG. 5 comprises a storage device 2, and a plurality of I/O devices 3b which record data on the storage device 2 and reproduce the data recorded in the storage device 2.

Each of the I/O device 3b has the same configuration as that of the aforementioned I/O device 3, and the description thereof is omitted. In the case of the I/O management system 5, a plurality of video cameras are connected to the respective I/O devices 3b. That is, different AV data taken by the respective video cameras are supplied to the respective I/O devices 3b.

Each of the I/O devices 3b accesses the single storage device 2 to record AV data on the storage device 2 while acquiring record information relating to the AV data. The record information is managed by a file system included in each of the I/O devices 3b. At the time of reproduction, while referring to the record information managed in each file system, each of the I/O devices 3b reads out the AV data stored in the storage device 2, edits it, and sends the edited AV data to a broadcast network.

That is, in the I/O management system 5, the record information relating to the AV data stored in the single storage device 2 is managed by a plurality of file systems provided respectively in the I/O devices 3b connected to the storage device 2. As a result, it is possible to share the AV data taken by a plurality of video cameras by storing the AV data in a single storage device 2, allowing the AV data to be utilized greatly as material data for editing. Further, utilization of the system can be enlarged by increasing a capacity of the storage device 2 in accordance with the number of the video cameras and volume of AV data taken by video cameras.

Figure 6:
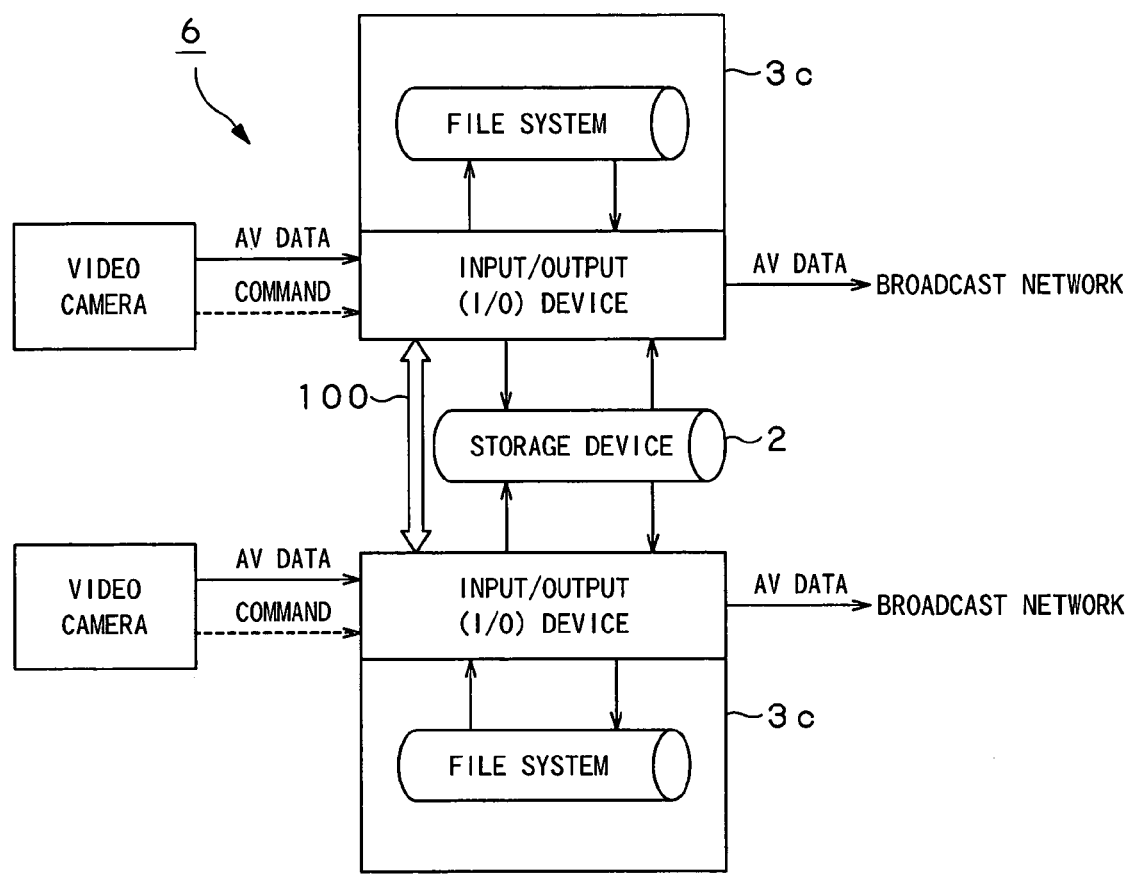
FIG. 6 is a block diagram showing an I/O management system having a function of communicating between I/O devices.

The configuration of an I/O management system 6 shown in FIG. 6 is obtained by adding a communication function for communication between a plurality of I/O devices 3 to the configuration of the I/O management system 5.

In the I/O management system 6, a communication path 100 is established between I/O devices 3c. Via the communication path 100, an I/O device 3c inquires another I/O device 3c about the presence or absence of record information, and receives the record information after the presence of the record information in a file system of the another device 3c has been confirmed. Note that, the communication path 100 may be wired, or wireless.

Each of the I/O devices 3c has the same configuration as that of the aforementioned I/O device 3 except that a communication function for establishing communication between the I/O devices 3c is provided in the control unit 11. In reproducing the AV data stored in the server, the I/O device 3c accesses a file system included therein to confirm the presence of record information relating to the AV data to be reproduced. When the record information exists in the file system of its own, the I/O devices 3c reads out the AV data based on the record information. Therefore, since responsiveness in searching record information can be enhanced, it is possible to rapidly read out the AV data stored in the storage device 2.

On the other hand, when the record information relating to the AV data to be reproduced does not exist in the file system of its own, the I/O device 3c inquires another I/O device 3c about the presence or absence of the record information. In response to the inquiry, the another I/O device 3c accesses a file system of its own to confirm the presence of the record information. When the record information exists in the file system of its own, the another I/O device 3c transfers, via the communication path 100, the record information to the I/O device 3c that has issued the inquiry. When the record information does not exist, the another I/O device 3c sends back corresponding notification to the I/O device 3c that has issued the inquiry.

As described above, at the time of reproducing AV data, the I/O device 3c firstly accesses a file system of its own to confirm the presence of the record information relating to the AV data. Next, the I/O device 3c inquires, via the communication path 100, another I/O device 3c about the presence or absence of the record information. In this manner, confirmation of the presence or absence of the record information is performed by priority for a file system of its own, so that responsiveness in searching record information can be enhanced. Further, even when the record information does not exist in a file system of its own, the I/O device 3c can easily obtain the record information by sequentially making inquiries to the other I/O devices 3. That is, in the I/O management system 6, it is possible for one I/O device 3c to easily read out the AV data that another I/O device 3c has recorded on the storage device 2.

That is, in the I/O management system 6, record information managed by each of the I/O devices 3c can be exchanged between the I/O devices 3c. Therefore, even when the number of video cameras and that of the I/O devices 3c connected to the video cameras are increased, and therefore, the volume of AV data that the entire I/O management system 6 handles is increased, the AV data can collectively be stored in the storage device 2, with the result that the data including lots of AV data can be reconstructed for TV broadcast in each of the I/O devices 3c.

Note that, the I/O management system 5 and the I/O management system 6 are not limited to the aforementioned embodiments. It is needless to say that only the record information management unit 22 may be provided separately from the I/O devices 3c as a record information management device 81 and connected to each I/O device 3c.

Figure 7:
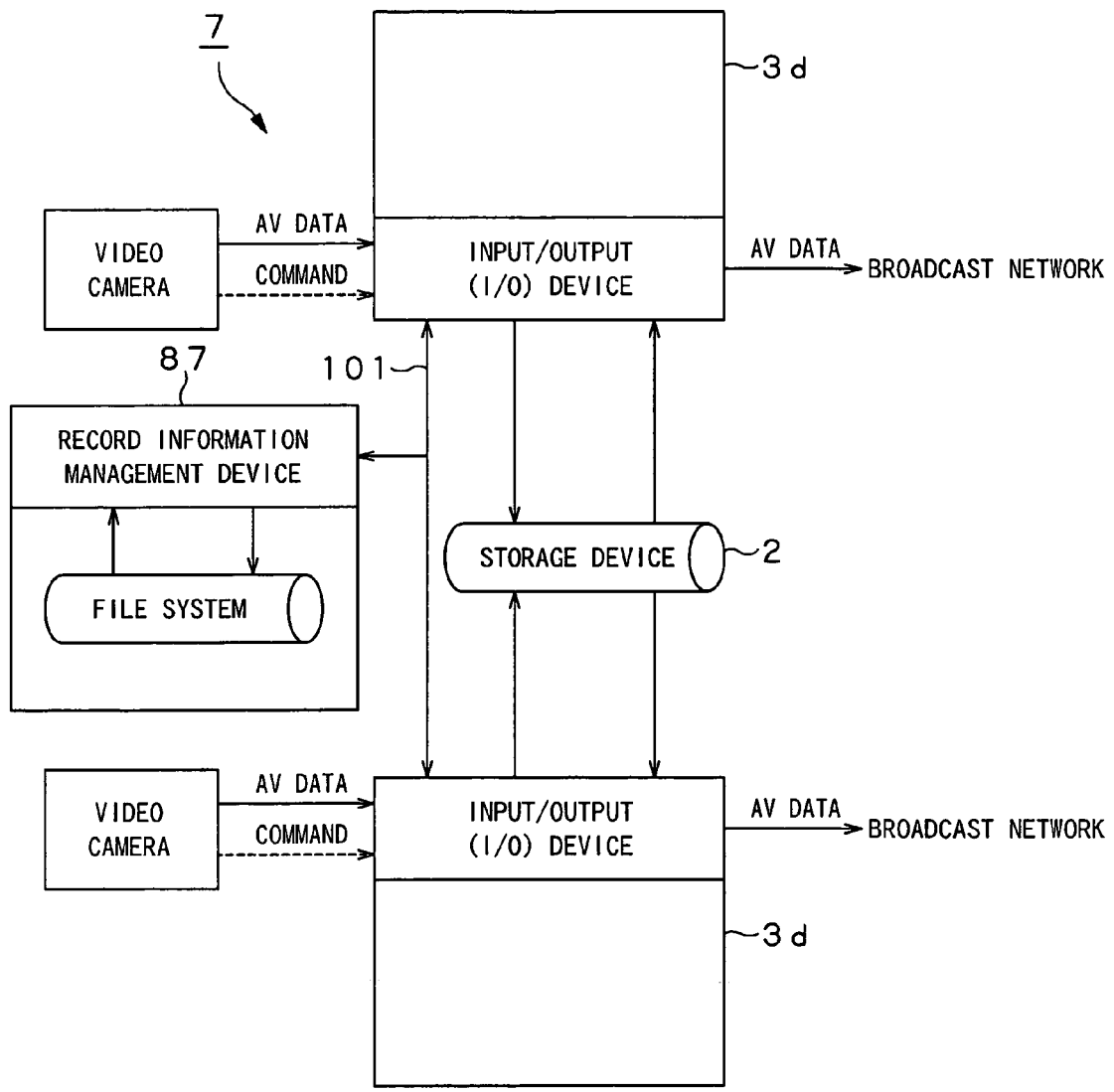
FIG. 7 is a block diagram showing the case where a plurality of I/O devices have a record information management device for managing record information in common.

An I/O management system 7 shown in FIG. 7 has the same configuration as that of the aforementioned I/O management system 6 except that the record information management device 87 for managing record information is provided separately from the I/O devices 3d and its function is shared among each of the I/O devices 3d. The I/O management system 7 therefore comprises a storage device 2, a plurality of I/O devices 3d which record data on the storage device 2 and reproduce the data recorded in the storage device 2, and a single record information management device 87 for managing record information.

The record information management device 87 is provided separately from the I/O devices 3d and has a function of the aforementioned record information management unit 22. The record information management device 87 is constituted by, for example, a PC or the like. The record information management device 87 includes a file system for collectively managing record information relating to the AV data to be recorded from each I/O device 3d to the storage device 2. The file system included in the record information management device 87 manages record information relating to all the AV data that has been recorded from each I/O device 3d to the storage device 2.

Note that, the record information management device 87 exchanges with each I/O device 3d commands for requesting OPEN, CLOSE of the AV data file stored in the storage device 2, updating a file name, deleting an AV data file, and the like.

In the I/O management system 7, a communication path 101 is established between the I/O devices 3d and between each I/O device 3 and the record information management device 87. Each of the I/O devices 3d inquires the record information management device 87 about the presence or absence of record information via the communication path 101. Note that, the communication path 101 may be wired, or wireless.

The I/O device 3d has a configuration in which the record information management unit 22 of the control unit 11 in the above example is omitted, and in which a communication function is provided in the control unit 11 to exchange data with another I/O device 3d and the record information management device 87.

Each I/O device 3d accesses the record information management device 87 to reproduce the AV data stored in the storage device 2, then acquires record information relating to the AV data to be reproduced, and reproduces the AV data stored in the storage device 2 on the basis of the acquired record information.

That is, in the I/O management system 7, a communication path for signals of record information, or signals for inquiring about the presence or absence of the record information which have uneven bandwidths, and another communication path for AV data are independently provided. As a result, the transfer bit rate between the storage device 2 and each of the I/O devices 3d can be kept constant. Further, responsiveness in searching record information can be enhanced, thereby realizing a smooth reproduction.

In the above example, the control unit 11 files AV data and records it on the storage device 2 while acquiring record information relating to the recording operation with respect to the storage device 2. However, the present invention is not limited to this. For example, firstly, record information representing a record area or a record start position may be generated in the record information management unit 22 at the recording time, and then the control unit 11 may record AV data on the storage device 2 based on the record information.

It is assumed that the I/O management system according to the present invention is applied to a LAN (Local Area Network) system installed within a broadcasting station. However, the present invention is not limited to this. For example, the storage device 2 and I/O device 3 and/or an I/O device 3 and another I/O device 3 may be connected through a network such as an Ethernet™ so that AV data transmitted from remote areas as well as from within the broadcasting station can be recorded or reproduced.

Further, the I/O device 3 of the present invention may be applied as, for example, an I/O interface device provided among interfaces.

Further, in the above embodiments, AV data is used to be recorded or reproduced. However, the present invention is not limited to this. It is needless to say that other kind of data may be recorded or reproduced.

What is claimed is:

1. An input/output device connected to a video camera and to a storage device, the input/output device controls only audio/video data input/output operations from or to the storage device having a non-linear accessible recording medium, the input/output device comprising:

input/output control unit outputting of externally supplied audio/video data from the video camera to the storage device, and inputting of audio/video data from the storage device; and record information management unit generating, storing and managing, through a file system provided therein, record management information related to the audio/video data acquired at the time when the audio/video data is recorded to the storage device by the input/output control unit, the file system is provided in the record information management unit independent of the storage device, wherein the storage device only stores the audio/video data, and wherein the input/output control unit accesses the file system of the record information management unit to acquire the record management information relating to the audio/video data to be reproduced and input/outputs the audio/video data from the storage device on the basis of the record management information managed by the file system of the record information management unit, a transfer bit rate between the storage device and the input/output control unit is constant since only the audio/video data is input/output between the storage device and the input/output control unit.

2. The input/output device according to claim 1, further comprising communication means for exchanging at least the record management information with another terminal, wherein when the input/output control unit controls input of the audio/video data from the storage device on the basis of record management information that is not managed by the record information management unit, the communication means receives the unmanaged record management information from another terminal, and the input/output control unit controls input of the audio/video data on the basis of the unmanaged record management information received through the communication means.

3. The input/output device according to claim 1, wherein the input/output control unit controls input/output of only video data or audio data transmitted from the video camera from or to the storage device.

4. An input/output device connected to a video camera and to a storage device, the input/output device controls only audio/video data input/output operations from or to the storage device having a non-linear accessible recording medium, the input/output device comprising:

input/output control unit outputting of externally supplied audio/video data from the video camera to the storage device, and inputting of audio/video data from the storage device; and communication means for exchanging record management information related to the audio/video data, acquired at the time when the audio/video data is recorded onto the storage device by the input/output control unit, with a record information management device that generates, stores and manages the record information through a file system provided therein, the file system is provided in the communication means independent of the storage device, wherein the storage device only stores the audio/video data, and wherein the input/output control unit accesses the file system of the record information management device to acquire the record management information relating to the audio/video data to be reproduced and input/outputs inputs/outputs audio/video data from the storage device on the basis of the record management information received from the record information management device, a transfer bit rate between the storage device and the input/output control unit is constant since only the audio/video data is input/output between the storage device and the input/output control unit.

5. The input/output device according to claim 4, further comprising another communication means for exchanging at least the record management information with another terminal, wherein when the input/output control unit controls input of audio/video data from the storage device on the basis of record management information that is not managed by the record information management device, the another communication means receives the unmanaged record management information from another terminal, and the input/output control unit controls input of the audio/video data on the basis of the unmanaged record management information received through the another communication means.

6. The input/output device according to claim 4, wherein the input/output control unit controls input/output of only video data or audio data transmitted from the video camera from or to the storage device.

7. An input/output management system connected to at least one video camera, the input/output management system comprising:

a storage device having a non-linear accessible recording medium; and one or more input/output devices which (1) has a control unit output externally supplied audio/video data from the at least one video camera to the storage device and input audio/video data from the storage device, and (2) has record information management unit generating, storing and managing, through a file system provided therein, record management information related to the audio/video data acquired at the time when the data is recorded onto the storage device by the control unit, the file system is provided in the record information management unit independent of the storage device, wherein the storage device only stores the audio/video data, and wherein the control unit of the input/output device unit accesses the file system of the record information management unit to acquire the record management information relating to the audio/video data to be reproduced and inputs/outputs audio/video data from the storage device on the basis of the record management information managed by the file system of the record information management unit, a transfer bit rate between the storage device and the input/output control unit is constant since only the audio/video data is input/output between the storage device and the input/output control unit.

8. The input/output management system according to claim 7, wherein when the input/output device controls input of audio/video data from the storage device on the basis of record management information that is not managed by the file system of the record information management unit, the input/output device acquires the unmanaged record management information through a communication path established with another input/output device.

9. The input/output management system according to claim 7, wherein the input/output device controls input/output of only video data or audio data transmitted from the at least one video camera from or to the storage device.

10. An input/output management system connected to at least one video camera, the input/output management system comprising:

a storage device having a non-linear accessible recording medium;

one or more input/output devices which outputs externally supplied audio/video data from the at least one video camera to the storage device and inputs audio/video data from the storage device; and a record information management device which generates, stores and manages, through a file system provided therein, record management information related to the audio/video data acquired at the time when the audio/video data is recorded onto the storage device by the input/output devices, the file system is provided in the record information management device independent of the storage device, wherein the storage device only stores the audio/video data, and wherein the input/output device unit accesses the file system of the record information management device to acquire the record management information relating to the audio/video data to be reproduced and input/outputs audio/video data from the storage device on the basis of the record management information managed by the file system of the record information management device, a transfer bit rate between the storage device and the input/output control means is constant since only the audio/video data is input/output between the storage device and the input/output devices.

11. The input/output management system according to claim 10, wherein when the input/output device controls input of audio/video data from the storage device on the basis of record management information that is not managed by the file system of the record information management device, the input/output device acquires the unmanaged record management information through a communication path established with another input/output device.

12. The input/output management system according to claim 10, wherein the record information management device is provided for the each one or more input/output devices.

13. The input/output management system according to claim 10, wherein the input/output device controls input/output of only video data or audio data transmitted from the at least one video camera from or to the storage device.

* * * * *